United States Patent
Kam et al.

(10) Patent No.: US 7,826,345 B2
(45) Date of Patent: Nov. 2, 2010

(54) NETWORK SPAN PROTECTION USING SPAN IDENTIFIERS

(75) Inventors: Anthony C. K. Kam, Arlington, MA (US); Raymond Y. Xie, Westford, MA (US); Tao Yang, Acton, MA (US); Naimish Patel, Boston, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 1796 days.

(21) Appl. No.: 10/886,154

(22) Filed: Jul. 7, 2004

(65) Prior Publication Data

US 2005/0041575 A1 Feb. 24, 2005

Related U.S. Application Data

(60) Provisional application No. 60/485,543, filed on Jul. 8, 2003.

(51) Int. Cl.
*H04J 1/16* (2006.01)

(52) U.S. Cl. ........................ 370/216; 370/218; 370/256; 370/403; 370/258; 370/389

(58) Field of Classification Search ................. 370/224, 370/231, 410, 223, 258, 389, 218, 256, 403, 370/216
See application file for complete search history.

(56) References Cited

U.S. PATENT DOCUMENTS

| | | | |
|---|---|---|---|
| 5,532,862 A * | 7/1996 | Tada et al. | 398/4 |
| 5,815,490 A | 9/1998 | Lu | |
| 5,826,038 A * | 10/1998 | Nakazumi | 709/251 |
| 6,122,250 A * | 9/2000 | Taniguchi | 370/222 |
| 6,141,320 A * | 10/2000 | Ikawa | 370/227 |
| 6,349,092 B1 * | 2/2002 | Bisson et al. | 370/258 |
| 6,721,268 B1 * | 4/2004 | Ohira et al. | 370/223 |
| 6,785,224 B2 * | 8/2004 | Uematsu et al. | 370/222 |
| 6,816,461 B1 * | 11/2004 | Scrandis et al. | 370/242 |
| 6,993,684 B2 * | 1/2006 | Ookawa et al. | 714/43 |
| 7,130,263 B1 * | 10/2006 | Ong et al. | 370/223 |
| 7,162,544 B2 * | 1/2007 | Ohkawa et al. | 709/251 |
| 7,173,902 B2 * | 2/2007 | Daniell et al. | 370/222 |
| 7,224,895 B2 * | 5/2007 | Garnot et al. | 398/3 |
| 7,319,663 B2 * | 1/2008 | Honda et al. | 370/217 |
| 2004/0184403 A1 | 9/2004 | Ohira et al. | |
| 2004/0190444 A1 * | 9/2004 | Trudel et al. | 370/224 |

\* cited by examiner

*Primary Examiner*—Ricky Ngo
*Assistant Examiner*—Dewanda Samuel
(74) *Attorney, Agent, or Firm*—Weingarten, Schurgin, Gagnebin & Lebovici LLP

(57) ABSTRACT

Each span of a communication network, such as a BLSR ring, is assigned a unique span ID. When a node of the network detects a failure in a network span, the node exchanges commands, according to an automatic protection switching (APS) protocol, that request other nodes of the network to switch network traffic from a working span to a protect span. The commands specify the working span by its span ID, without necessarily specifying a source node ID or a destination node ID for the commands. The span ID occupies fewer bits in the commands than bits representing a combination of the source node ID and the destination node ID. Alternatively, the commands specify a destination node ID without a span ID or a source node ID, or the commands specify a source node ID without a span ID or a destination node ID.

4 Claims, 8 Drawing Sheets

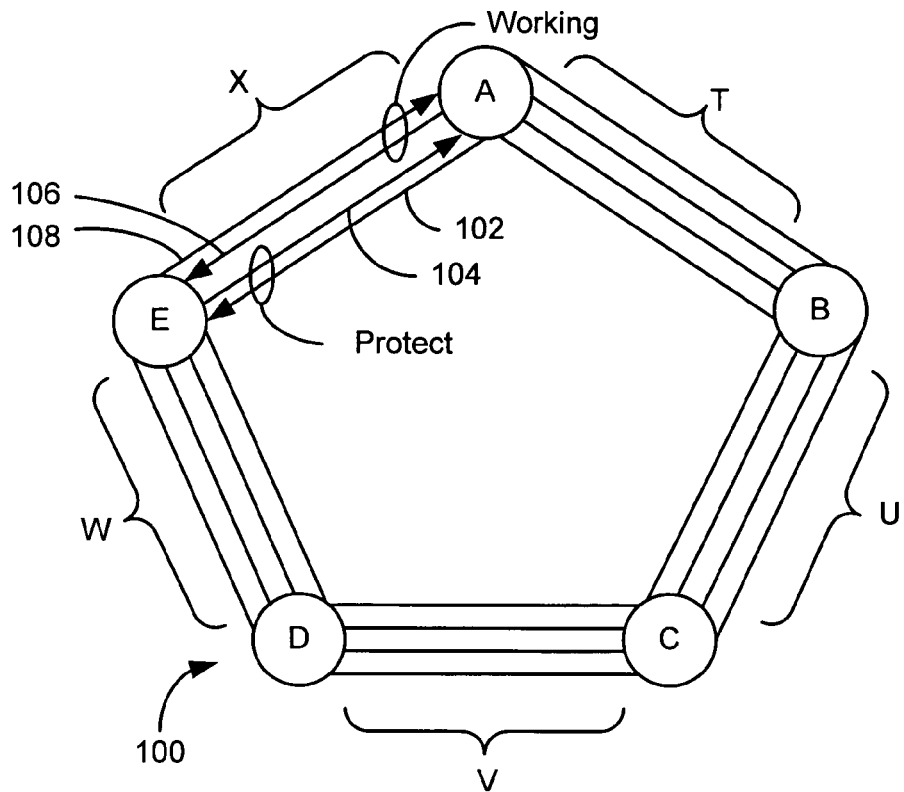
*Fig. 1*
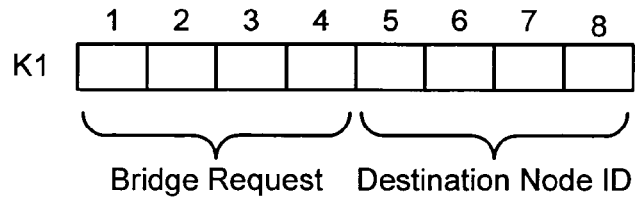
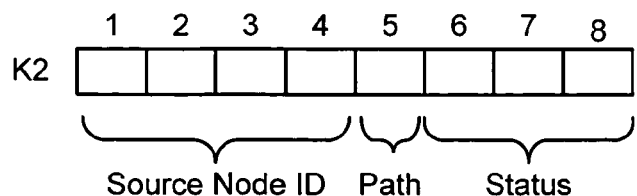
(Prior Art)
*Fig. 2*

| Bits 1-4 | Bridge Request |
|---|---|
| 1111 | Lockout of Protection (span) [LP-S] or Signal Fail (protection) [SF-P] |
| 1110 | Forced Switch (span) [FS-S] |
| 1101 | Forced Switch (ring) [FS-R] |
| 1100 | Signal Fail (span) [SF-S] |
| 1011 | Signal Fail (ring) [SF-R] |
| 1010 | Signal Degrade (protection) [SD-P] |
| 1001 | Signal Degrade (span) [SD-S] |
| 1000 | Signal Degrade (ring) [SD-R] |
| 0111 | Manual Switch (span) [MS-S] |
| 0110 | Manual Switch (ring) [MS-R] |
| 0101 | Wait to Restore [WTR] |
| 0100 | Exerciser (span) [EXER-S] |
| 0011 | Exerciser (ring) [EXER-R] |
| 0010 | Reverse Request (span) [RR-S] |
| 0001 | Reverse Request (ring) [RR-R] |
| 0000 | No Request [NR] |

(Prior Art)

*Fig. 3*

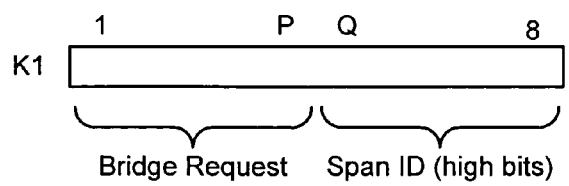

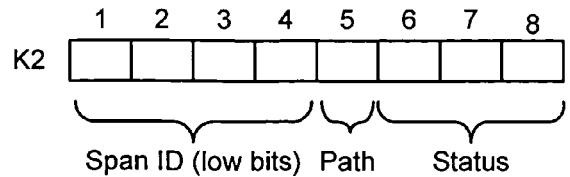

*Fig. 4*

| Bits 1-5 | Bridge Request |
|---|---|
| 11111 | Clear |
| 11110 | Lockout of Working Channels - Span Switch [LOW-S] |
| 11101 | Lockout of Working Channels - Ring Switch [LOW-R] |
| 11100 | Lockout of Protection - All Spans |

| Ring Map | | | | |
|---|---|---|---|---|
| Node 1 | Node 2 | Span ID | Straddling Span | Protect Arc |
| A | B | T | No | - |
| B | C | U | No | - |
| C | D | V | No | - |
| D | E | W | No | - |
| E | A | X | No | - |
| D | B | Y | Yes | W-X-T, V-U |

| Bits 1-4 | Bridge Request |
|---|---|
| 1111 | Lockout of Protection (span) [LP-S] or Signal Fail (protection) [SF-P] |
| 1110 | Forced Switch (span) [FS-S] |
| 1110 | Forced Switch (straddling span) [FS-T] |
| 1101 | Forced Switch (ring) [FS-R] |
| 1100 | Signal Fail (span) [SF-S] |
| 1100 | Signal Fail (straddling span) [SF-T] |
| 1011 | Signal Fail (ring) [SF-R] |
| 1010 | Signal Degrade (protection) [SD-P] |
| 1001 | Signal Degrade (span) [SD-S] |
| 1001 | Signal Degrade (straddling span) [SD-T] |
| 1000 | Signal Degrade (ring) [SD-R] |
| 0111 | Manual Switch (span) [MS-S] |
| 0111 | Manual Switch (straddling span) [MS-T] |
| 0110 | Manual Switch (ring) [MS-R] |
| 0101 | Wait to Restore [WTR] |
| 0100 | Exerciser (span) [EXER-S] |
| 0100 | Exerciser (straddling span) [EXER-T] |
| 0011 | Exerciser (ring) [EXER-R] |
| 0010 | Reverse Request (span) [RR-S] |
| 0010 | Reverse Request (straddling span) [RR-T] |
| 0001 | Reverse Request (ring) [RR-R] |
| 0000 | No Request [NR] |

*Fig. 13*

NETWORK SPAN PROTECTION USING SPAN IDENTIFIERS

CROSS REFERENCE TO RELATED APPLICATIONS

This application claims the benefit under 35 U.S.C. §119 (e) of Provisional Patent Application No. 60/485,543, filed Jul. 8, 2003 and titled "Bidirectional Line Switched Ring Employing Straddling Span Protection and Protocol."

STATEMENT REGARDING FEDERALLY SPONSORED RESEARCH OR DEVELOPMENT

N/A

BACKGROUND OF THE INVENTION

This application relates to restoring capacity in a network following a failure of a network channel or node, particularly in a telecommunications network.

Telecommunications subscribers and telecommunications carriers generate a wide range of digital signals having a wide range of data rates. To carry this digital traffic, telecommunication carriers typically install high-capacity fiber optic links between switching offices and multiplex this digital traffic onto the fiber optic links. Synchronous Optical Network (SONET) is a standard for data transmission over fiber optic networks. SONET is widely used by telecommunications carriers in the United States, while a related standard (Synchronous Digital Hierarchy (SDH)) is used in some other countries. These standards define technologies for carrying many signals of different capacities through hierarchical synchronous optical networks. At the lowest level of such a hierarchy, these standards define transport signals. For example, SONET defines a Synchronous Transport Signal—level 1 (STS-1), which operates at a 51.84 Mbps data rate. Higher-level signals (STS-n) are integer multiples of STS-1. The optical counterpart of an STS-n signal is designated an Optical Carrier N (OC-n).

To provide highly reliable service, telecommunication carriers often create rings that interconnect a number of switching offices or other nodes. Each node is connected to the next node on the ring by an OC-n span. In a typical 4-fiber, bi-directional line switched ring (BLSR), four optical fibers extend between, and therefore interconnect, each pair of adjacent nodes. Each optical fiber provides one channel. Two of the fibers form two oppositely-directed, unidirectional "working" channels, and the remaining two fibers form two oppositely-directed, unidirectional "protect" channels. Each channel can carry traffic in either a clockwise or a counter clockwise direction along the ring from a source node to a destination node. The clockwise-oriented working channels collectively form a clockwise working ring. Similarly, the other channels form respective rings, i.e. a counter-clockwise working ring, a clockwise protect ring and a counter-clockwise protect ring.

The protect channels provide a backup capability, which can be used in case of a failure of a working channel, an entire span or a transit node. The protect channels can be used individually or collectively, depending on the failure. If only a working channel of a span fails, the like-directed (i.e., clockwise or counter-clockwise) protect channel along the same span can be used to take over for the failed working channel. A node (typically the node at the receiving end of an optical fiber) detects failures in the channels that terminate at that node. If the node detects a failure in an adjacent working channel or span, the node sends a command to the node at the opposite end of the failed span or channel (the "far node") requesting that the far node connect ("bridge") the appropriate working channel to the appropriate protect channel, thus switching network traffic onto the protect channel. This is referred to as "span switching." Although only one working channel (clockwise or counterclockwise) in a span might have failed, typically both working channels are switched to their respective protect channels. This is commonly referred to as "bi-directional protection switching."

If an entire span fails, such as a result of a cable cut or a node failure, all the protect channels of the rest of the ring take over for the failed span. In this case, the node that detects the failure requests the far node to bridge each of its working channels to the far node's oppositely-directed protect channel. The node that detects the failure also bridges its working channels to its oppositely-directed protect channels. Thus, the two nodes on opposite sides of the failure loop network traffic from their working channels onto oppositely-directed protect channels. The remaining nodes of the ring enter a pass-through mode, in which they bridge their like-directed protect channels (incoming clockwise protect channel to outgoing clockwise protect channel, etc.). Thus, a continuous path around the ring is restored, albeit a longer path that enters and leaves each of the remaining nodes twice. This is referred to as "ring switching." Collectively, this self-restoring capability (including span switching and ring switching) is commonly referred to as automatic protection switching (APS).

STS-1 uses a 810-byte transport frame to carry payload and overhead information. The overhead information supports several "channels" (not to be confused with working and protect channels) that are used for operation, administration, maintenance and provisioning (OAM&P) of the network and higher level services. For example, the so-called K1 and K2 bytes provide an automatic protection switching (APS) channel, which enables line-terminating entities (LTEs) to send and receive remote defect indications (RDIs), alarm indication signals (AIS-L) and to implement the automatic protection switching discussed above. For example, nodes of a BLSR ring send commands via the APS channel to request other nodes to perform span switches or ring switches. These "bridge requests" include "forced switch-span" (FS-S) and "forced switch-ring" (FS-R).

Although SONET is widely used and robust, it has shortcomings. For example, BLSR rings are limited to a maximum of 16 nodes. Some telecommunication carriers would prefer to construct BLSR rings having more than sixteen nodes. Furthermore, the APS channel supports only sixteen unique bridge requests. Consequently, some BLSR functions, such as Clear, must be requested via "out-of-band" communication channels. A ring formed of a number of nodes and spans sometimes includes one or more "straddling" spans, i.e., spans that interconnect nodes of the ring but that do not lie along the ring. Although a theoretical framework for protecting straddling spans in pre-configured protection cycles (p-cycles) has been proposed, the BLSR protocol does not support protecting straddling spans.

BRIEF SUMMARY OF THE INVENTION

According to one embodiment of the present invention, each span of a communication network is assigned a unique span ID. When a node of the network detects a failure in a single channel of a span, a failure of more than one channel of a span (including a straddling span) or a failure of another node of the network, the node sends and receives commands according to an automatic protection switching (APS) protocol that requests other nodes of the network to switch network traffic from a working span (including a straddling span), or a working channel of the working span, to one more protect channels. The commands specify the working span by its span ID, without necessarily specifying a source node ID or a destination node ID for the commands. The span ID occupies fewer bits in the commands than a combination of the source node ID and the destination node ID. Consequently, the messages can accommodate span IDs larger than four bits, and networks can have more than 16 nodes. Alternatively, the commands specify a destination node ID without a span ID or a source node ID, or the commands specify a source node ID without a span ID or a destination node ID. Alternatively, a straddling span is identified by node IDs of its two nonadjacent terminal nodes. A set of rules governs straddling span switching. Optionally or in addition, more than four bits are available for bridge request command codes in the messages. Thus, more than 16 unique bridge request commands can be defined.

BRIEF DESCRIPTION OF THE SEVERAL VIEWS OF THE DRAWINGS

These and other features, advantages, aspects and embodiments of the present invention will become more apparent to those skilled in the art from the following detailed description of an embodiment of the present invention when taken with reference to the accompanying drawings, in which:

FIG. 1 is a simplified schematic diagram of an exemplary ring network;

FIG. 2 is schematic diagram of K1 and K2 bytes in an automatic protection switching protocol message, according to the prior art;

FIG. 3 is a list of bridge requests codes, according to the prior art;

FIG. 4 is schematic diagram of K1 and K2 bytes, according to an embodiment of the present invention;

FIG. 13 is an exemplary list of bridge requests codes, according to an embodiment of the present invention.

DETAILED DESCRIPTION OF THE INVENTION

Figures 5, 6:
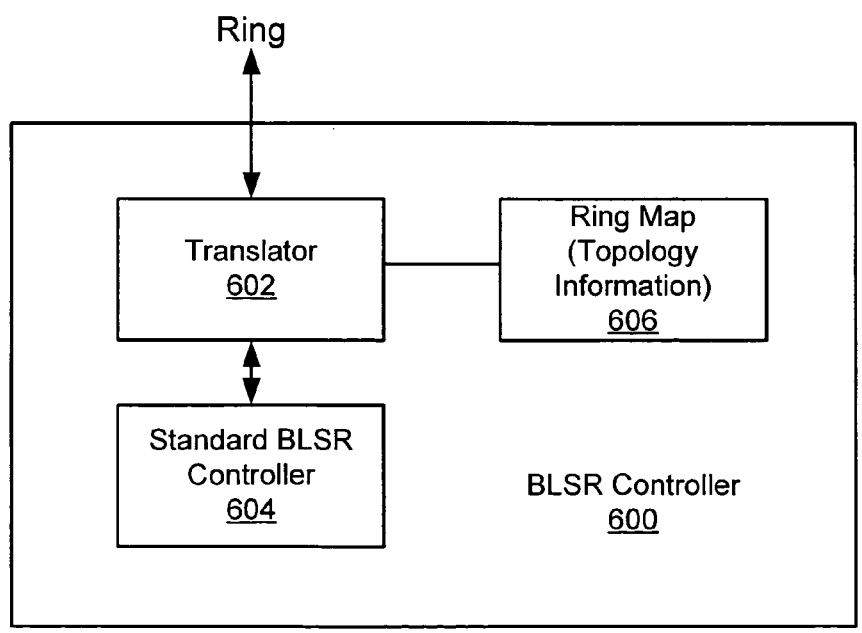
FIG. 5 is an exemplary list of additional bridge requests codes, according to an embodiment of the present invention.
FIG. 6 is a block diagram of a BLSR controller, according to an embodiment of the present invention.

This contents of Provisional Patent Application No. 60/485,543, filed Jul. 8, 2003 and titled "Bidirectional Line Switched Ring Employing Straddling Span Protection and Protocol" are hereby incorporated by reference herein.

Telecommunications carriers and other industries often use optical fibers to carry digital data. These optical fibers are often used to interconnect nodes of a network. To improve the ability of these networks to provide data transport in case of a link or node failure, ring topologies and automatic protection switching (APS) are often employed. FIG. 1 illustrates an exemplary 4-fiber bi-directional line-switched ring (BLSR) 100, in which the present invention can be practiced. The invention can also be practiced in other network architectures, such as 2-fiber networks, mesh networks, etc., as will be evident to those of ordinary skill in the art.

The BLSR ring 100 includes nodes A, B, C, D and E. These nodes are interconnected by spans T, U, V, W and X of optical fiber cable. Each span T-X consists of four optical fibers, such as optical fibers 102, 104, 106 and 108. Each optical fiber carries data in one direction, as indicated by arrowheads on the optical fibers 102-108. (In other applicable architectures, optical fibers carrying bi-directional data can be employed.) Each of these optical fibers provides a channel, over which data can be sent. Two oppositely-directed channels of each span are designated "working" channels, and the other two oppositely-directed channels of each span are designated "protect" channels.

In case of a failure of a working channel, an entire span or a node, data can be switched from one or more working channels to one more protect channels, as is well-known in the art. (See, for example, SONET Bi-directional Line-Switched Ring Equipment Generic Criteria, GR-1230-Core, Issue 4, Bellcore, December, 1998.) For example, if a node detects a loss of signal (LOS), loss of frame (LOF), a line bit error rate (BER) that exceeds a predetermined threshold, an alarm indication signal (AIS) or another protectable hard failure, the node can send a signal fail-span (SF-S) message (bridge request) to initiate a span switch from the failed working channel to the span's like-directed protect channel. Similarly, if a node or an entire span fails, the node that detects the failure can send a signal fail-ring (SF-R) message to initiate a ring switch.

The bridge requests are sent over K1 and K2 bytes of an automatic protection switching (APS) channel, as is well-known. FIG. 2 illustrates the bit definitions of the K1 and K2 bytes, according to the prior art. Bits 1-4 in K1 encode the bridge request. Since the bridge request field is four bits wide, only 16 unique bridge requests can be defined. FIG. 3 illustrates the prior art definitions of the bridge request codes. Bridge requests have respective implicit priorities, which are used to arbitrate among competing bridge requests in case of multiple concurrent failures in a ring. For example, signal fail-span (SF-S) has a higher priority than signal fail-ring (SF-R). Thus, if a working channel in one span fails, switching its traffic to its corresponding protect channel takes priority over a ring switch, which had previously occurred, for example, as a result of the failure of a different span.

The K2 byte also includes a path bit (bit 5) and a status field (bits 6-8). The path bit indicates whether a bridge request is sent by a source node to a destination node along a short path or along a long path around a ring.

Each node of a prior-art BLSR ring is provisioned with a node ID. Bits 1-4 in K2 are used to identify the sending node (source node) of a bridge request, and bits 5-8 in K1 are used to identify the intended receiving node (destination node). Since the source node ID and the destination node ID fields in K1 and K2 are each four bits wide, all node IDs must be in the range 0-15. Thus, a BLSR ring according to the prior art can have no more than 16 nodes.

In accordance with the present disclosure, the source and destination node IDs are omitted from the K1 and K2 bytes of a bridge request. Including the source and destination node IDs in the K1 and K2 bytes is needlessly redundant, and therefore wastes bits in the K1 and K2 bytes. Instead of separate source and destination node IDs, the K1 and/or K2 bytes of a bridge request can simply identify the span implicated by the bridge request. Thus, the bridge request lacks an explicit identification of the source and the recipient (destination) nodes. Instead of, or in addition to, keeping track of the topology of a network in terms of node IDs, according to an embodiment of the present invention, each node of the network keeps track of the topology in terms of span IDs. In other respects, automatic protection switching, communications among the nodes of a network and other BLSR protocol aspects can remain unchanged.

FIG. 4 shows layouts of the K1 and K2 bytes, according to one embodiment of the present invention. In this embodiment, each span of a network is assigned a span ID between 0 and N. Each node is provisioned with the span IDs of all spans terminating at the node. Typically, each node is also provisioned with information about the other nodes of the network and the span IDs of all spans terminating at each of the other nodes. This and other provisioning (referenced below) can be accomplished by any appropriate mechanism, such as through an operating system (OS), workstation (WS) or other human or automatic interface, as is well known in the art.

When a node sends a bridge request related to a span, the node includes the span's span ID in the K1 and/or K2 bytes. For example, referring back to FIG. 1, if node A detects a signal failure in working channel 106, node A can send a signal fail-span (SF-S) bridge request with the span ID of span X. As noted, node E would have been provisioned with the span IDs (X and W) of the spans that terminate at node E.

When node E receives the bridge request, node E can determine that the bridge request is meant for node E, based on the span ID in the bridge request. Any bridge request that identifies span X can be directed only to node A or to node E, because span X terminates at only nodes A and E. Furthermore, bridge requests can be sent only to adjacent nodes and only concerning spans that terminate at the intended recipient of the bridge request. Thus, a bridge request that identifies span X can be sent by only node A or node E. Since node E did not send the bridge request, node E can unambiguously determine that it must be the intended recipient of the bridge request.

The number of bits in the span ID field of the K1 and/or K2 bytes can be chosen to accommodate the maximum number of nodes that are to be supported in a network. As shown in FIG. 4, the low-order bits of the span ID occupy bits 1-4 of the K2 byte, and the high-order bits of the span ID occupy bits Q to 8 of the K1 byte, where Q is selected to accommodate the maximum number of nodes in the ring. The remaining P bits (where P=Q-1) of the K1 byte are available to store a bridge request code. If four bits are used for the bridge request code (i.e., P=4), eight bits are available for the span ID, thus a span ID of up 255 can be stored in the K1 and K2 bytes, and a network of up to 255 nodes can be supported. All nodes of a network should be provisioned with the value of P (and Q, if P≠Q-1).

If fewer than 128 nodes are to be supported in a network, the span ID field can occupy fewer than eight bits, i.e. Q can be greater than 5. In this case, more than four bits are available for the bridge request field and, consequently, more than sixteen unique bridge request codes can be accommodated in the bridge request field (i.e., bits 1-P of the K1 byte). In one embodiment of the present invention, some or all of the BLSR function requests (such as Clear) that, according to the prior art, must be sent over an out-of-band channel are instead assigned new bridge request codes and can be sent via the K1 byte. FIG. 5 is an exemplary list of new bridge request codes, some or all of which can be added to the prior art list of bridge request codes shown in FIG. 3, depending on the value chosen for P. Additional existing or new BLSR function requests can be added to the list in FIG. 5. Furthermore, the bridge request codes chosen for these functions are a matter of design choice.

The values of P and Q can be chosen to trade off between the number of unique bridge request codes that need to be supported and the number of nodes that need to be supported. If the number of needed bridge request codes and the number of nodes to be supported are such that the bridge request field and the span ID field collectively require fewer than 12 bits, the remaining bits can be used for another purpose. In this case, P≠Q-1. That is, a new field is added between the bridge request code and the span ID in K1. Similarly, if the number of needed bridge request codes is less than eight, P can be less than four. Although FIG. 4 shows the high-order bits of the span ID stored in the K1 byte, the placements of the high-order bits and the low-order bits of the span ID can be swapped between the K1 and the K2 bytes. Although not shown in FIG. 4, if more than 255 bridge request codes are required, and fewer than four bits are required to uniquely identify the span IDs, the bridge request field can wrap from the K1 byte onto the K2 byte. Similarly, the placements of other fields in the K1 and K2 bytes are design choices and can be changed without departing from the spirit or scope of the invention. If necessary, the nodes of a network can be provisioned with information about the placements of the fields in K1 and K2.

As described above, in one embodiment of the present invention, the K1 and/or K2 bytes contain a span ID, and nodes of a network issue bridge requests with reference to span IDs. In another embodiment, the K1 and/or K2 bytes of a bridge request contained a destination node ID where the implicated span terminates, instead of the span ID of the span implicated by the bridge request. The destination node ID can be stored in bits Q-8 of the K1 byte and/or bits 1-4 of the K2 byte, or elsewhere as discussed above with reference to span IDs. No source node ID need be specified. Thus, the bridge request lacks an explicit identification of the source node. By referring to the direction from which the bridge request arrived (i.e., clockwise or counterclockwise), the path bit (bit 5) in the K2 byte (FIG. 4) and the destination node ID, a receiving node, including the destination node, can uniquely identify the span implicated by the bridge request. Other aspects of the K1 and K2 bytes, such as the number of bits used for the bridge request and the number of bits used for the destination node ID, are similar to the embodiment in which the K1 and/or K2 bytes contain a span ID. Thus, more than 15 nodes can be supported.

In yet another embodiment, the K1 and/or K2 bytes of a bridge request contain a source node ID, instead of the span ID or the destination node ID. Thus, the bridge request lacks an explicit identification of the recipient (destination) node. By referring to the direction from which the bridge request arrived, the path bit and the source node ID, a receiving node can uniquely identify the span implicated by the bridge request. In other respects, this embodiment is similar to the two previously discussed embodiments.

Several mechanisms have thus far been disclosed for supporting more than 15 nodes in a network and for constructing, addressing, sending and receiving bridge requests or other messages to or from these nodes. As noted, in one embodiment of the present invention, instead of, or in addition to, keeping track of the topology of a network in terms of node IDs, each node of the network keeps track of the topology in terms of span IDs. In other respects, automatic protection switching, communications among the nodes of a network and other BLSR protocol aspects can remain unchanged.

FIG. 6 illustrates one embodiment of a BLSR controller 600, according to the present invention. Such a BLSR controller 600 can reside in a node of a network. In this embodiment, a translator 602 is disposed in a communication path between a standard BLSR controller 604 and a BLSR ring. Bridge requests sent along the ring refer to span IDs, as shown in FIG. 4, whereas the standard BLSR controller 604 sends and receives requests that include source and destination node Ids, as shown in FIG. 2. The BLSR controller 600 includes a ring map 606 that contains topology information about the ring. The translator 602 uses the ring map 606 to translate bridge requests arriving from the ring, such as bridge requests that include span IDs, into bridge requests that include source and destination node IDs, as shown in FIG. 2. Similarly, the translator 602 uses the ring map 606 to translate bridge requests sent by the standard BLSR controller 604, i.e. bridge requests that refer to source and destination node IDs, into bridge requests that can be sent along the ring, i.e. bridge requests that include span IDs.

Figure 7:
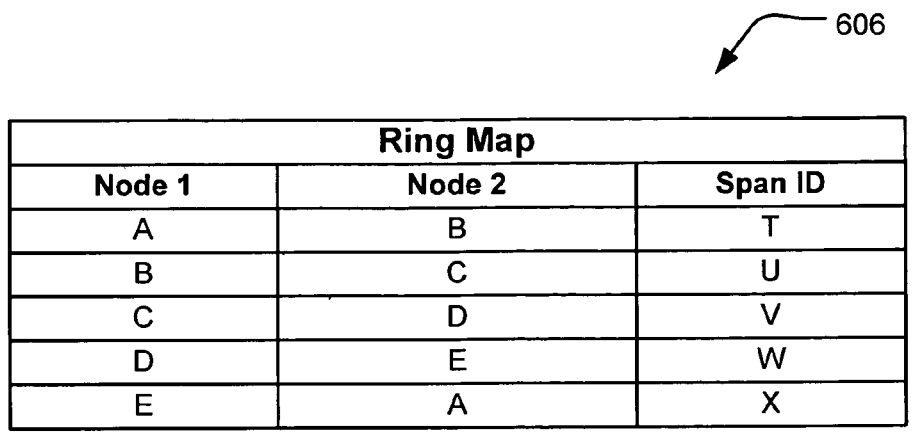
FIG. 7 is an exemplary ring map, according to an embodiment of the present invention.

FIG. 7 is an exemplary ring map 606 that describes the ring shown in FIG. 1. Each row of the ring map 606 corresponds to a span of the ring. Each row identifies two nodes and a span that extends between the two nodes. For example, the first row corresponds to span T and nodes A and B. As shown in FIG. 1, span T extends between nodes A and B. The rows of the ring map 606 can be ordered according to the occurrences of the spans, as the ring is traversed in a particular direction, such as clockwise, beginning with the current node. The ring map 606 or other data maintained by the BLSR controller 600 can also indicate in which node of the ring this BLSR controller resides.

Figure 8:
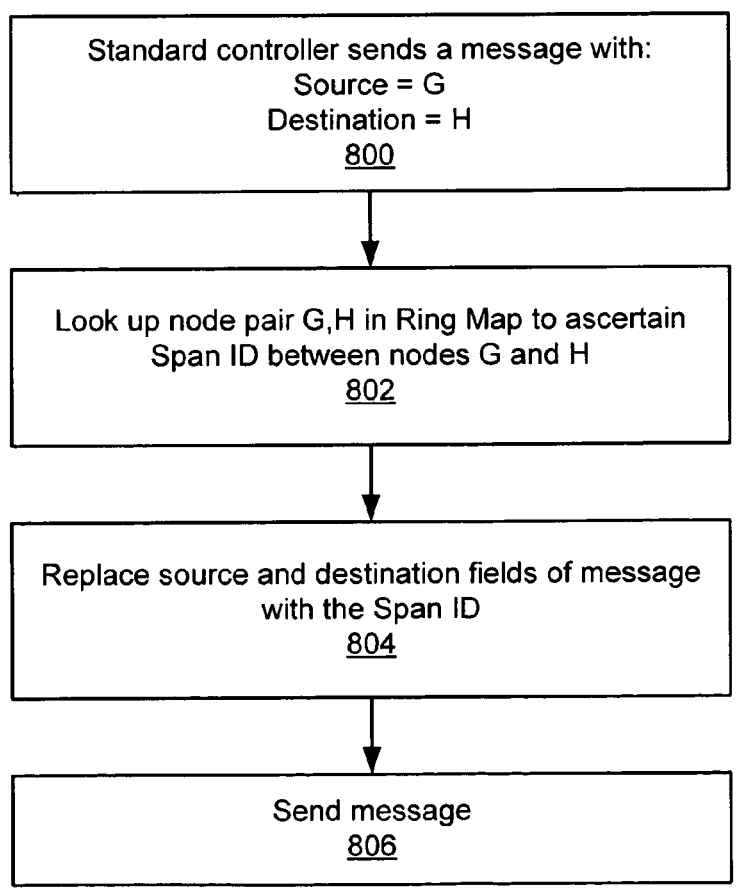
FIG. 8 is a simplified flowchart illustrating operations performed by a BLSR controller, according to an embodiment of the present invention.

FIG. 8 is a flowchart illustrating how messages sent by the standard BLSR controller 604 can be translated for transmission along the ring. At 800, the standard BLSR controller 604 sends a message with a source and destination node ID pair. At 802, the translator 602 looks up the node ID pair in the ring map 606 to ascertain the span ID of the span that extends between the nodes. At 804, the translator 602 replaces the source and destination node IDs in the message with the ascertained span ID. At 806, the message is sent along the ring.

Figure 9:
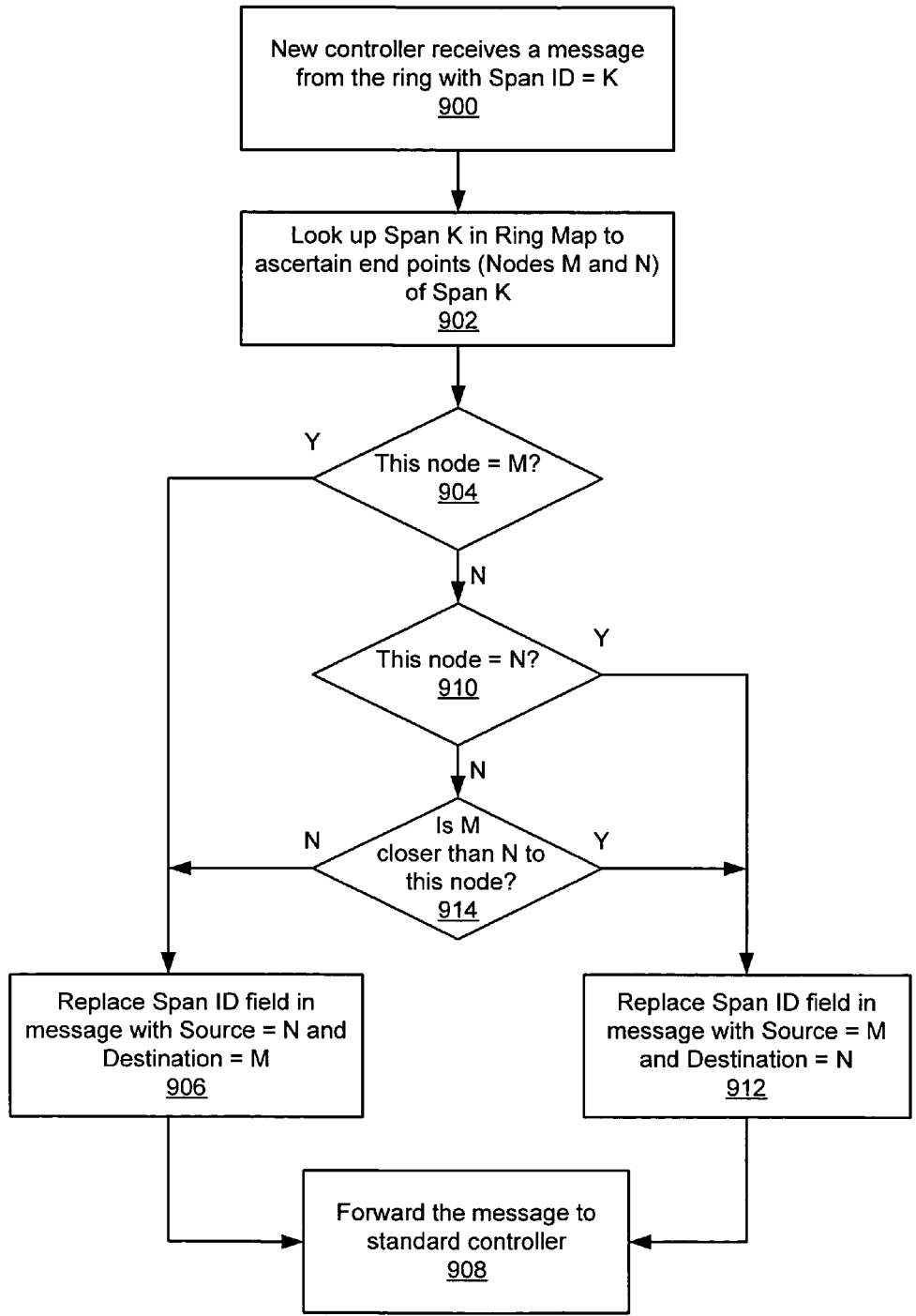
FIG. 9 is a simplified flowchart illustrating other operations performed by a BLSR controller, according to an embodiment of the present invention.

FIG. 9 is a flowchart illustrating how messages received by the BLSR controller 600 from the ring can be translated for processing by the standard BLSR controller 604. At 900, a message having a span ID is received from the ring. At 902, the translator 602 looks up the span ID in the ring map 606 to ascertain the endpoints of the corresponding span, i.e. the node IDs of the nodes at which the span terminates. For purposes of illustration, the endpoints will be referred to as nodes "M" and "N."

At decision box 904, the translator 606 ascertains whether the node, in which the BLSR controller 600 resides, is node M. In other words, the translator 606 determines if the current node is at one end of the span that is implicated by the message. If so, the message was sent to the current node. (The message must have been sent to the current node, because messages can be sent only to adjacent nodes, the implicated span terminates at the current node and the message was not sent by the current node.) If the message was sent to the current node, control passes to 906, where the span ID field in the message is replaced with source node ID=N and destination node ID=M, and at 908 the message is forwarded to the standard BLSR controller for processing.

At decision box 910, the translator 606 ascertains whether the node, in which the BLSR controller 600 resides, is node N. In other words, the translator 606 determines if the current node is at the other end of the span that is implicated by the message. If so, the message was sent to the current node, and control passes to 912, where the span ID field in the message is replaced with source node ID=M and destination node ID=N. At 908, the message is forwarded to the standard BLSR controller 604 for processing.

If the current node is located at neither end of the span implicated by the message, control is passed to decision box 914. In this case, the translator 602 ascertains which node (M or N) is closer to the current node. If node M is closer than node N to the current node, control passes to 912, where the span ID field in the message is replaced with source node ID=M and destination node ID=N. On the other hand, if node M is not closer than node M, control passes to 906, where the span ID field in the message is replaced with source node ID=N and destination node ID=M. In either case, control then passes to 908, where the message is forwarded to the standard controller 604 for processing.

Which node (M or N) is closer to the current node can be determined by searching the ring map 606 (starting with the current node) in a direction opposite the direction from which the received message arrived. The first node thus found (M or N) is the closer node.

Optionally, the standard BLSR controller 604 can be modified to handle more than 16 nodes. This modification involves increasing the size of a table in the standard BLSR controller 604, so the table has at least as many entries as there are nodes in the network. Execution loop limits and other constants may have to be increased to accommodate the larger table size. In addition, the standard BLSR controller 604 is modified to accept larger than 4-bit source and destination node IDs, however the basic logic of the standard BLSR controller 604 remains unchanged.

Optionally, if the bridge request field of the K1 byte (FIG. 4) is larger than four bits, i.e. additional bridge requests commands have been defined, before or instead of forwarding the message to the standard controller at 908, the translator 602 or another component (not shown) of the BLSR controller 600 can process the bridge request in the K1 byte.

The translator 602 also translates provisioning information, such as node ID, and provides this translated information to the standard BLSR controller 604.

Figure 10:
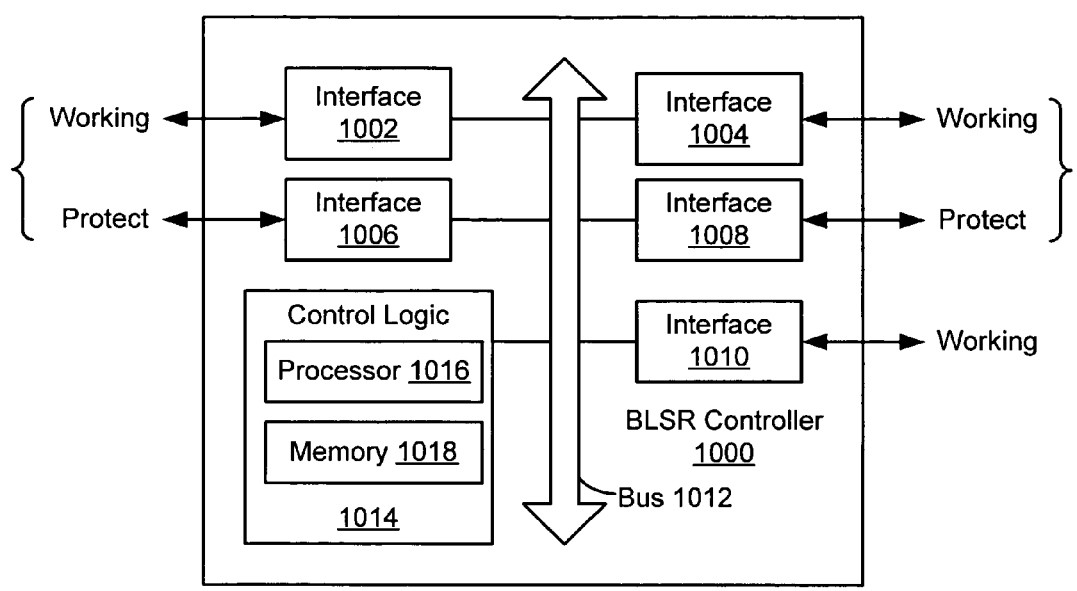
FIG. 10 is a block diagram of a BLSR controller, according to another embodiment of the present invention.

FIG. 10 illustrates another embodiment of a BLSR controller 1000, according to the present invention. Such a BLSR controller 1000 can reside within a node of a network. In this embodiment, each working channel and each protect channel terminates at an interface 1002, 1004, 1006 and 1008, respectively. For simplicity, the channels are illustrated as bi-directional channels, although each channel may comprise two unidirectional fiber links. (Optionally, one or more additional interfaces, such as interface 1010, can be included in the BLSR controller 1000, as discussed in more detail below.) These interfaces 1002-1010 are each connected to a bus 1012. Control logic 1014, which includes a processor 1016 and memory 1018, is also connected to the bus 1012 and, thereby, controls operation of the interfaces 1002-1010, receives status information from the interfaces and controls other aspects of the BLSR controller 1000. The processor 1016 executes instructions and accesses data stored in the memory 1018 to perform the above-listed functions. This data can include provisioning data provided by a human or another system, as discussed above and below.

Under control of the instructions stored in the memory 1018, the control logic 1014 processes K1 and K2 bytes, including span IDs and bridge requests, received from other nodes of the network. In response to receiving these bridge requests, the control logic 1014 can bridge a selected one of the working channels to another working channel or to a protect channel. Similarly, the control logic 1014 can bridge one protect channel to the other protect channel. Thus, the BLSR controller 1000 can perform automatic protection switching. Similarly, if the BLSR controller 1000 detects a channel or node failure, the control logic 1014 sends appropriate bridge requests, which includes span IDs according to this embodiment of the present invention, to other nodes of the network to request that those nodes switch spans or rings, as appropriate. As previously noted, bridge request messages can identify an implicated span by its span ID. Alternatively, as noted above, the source node ID (without a destination node ID) or a destination node ID (without a source node ID) can be used to identify the implicated span.

Figures 11, 12:
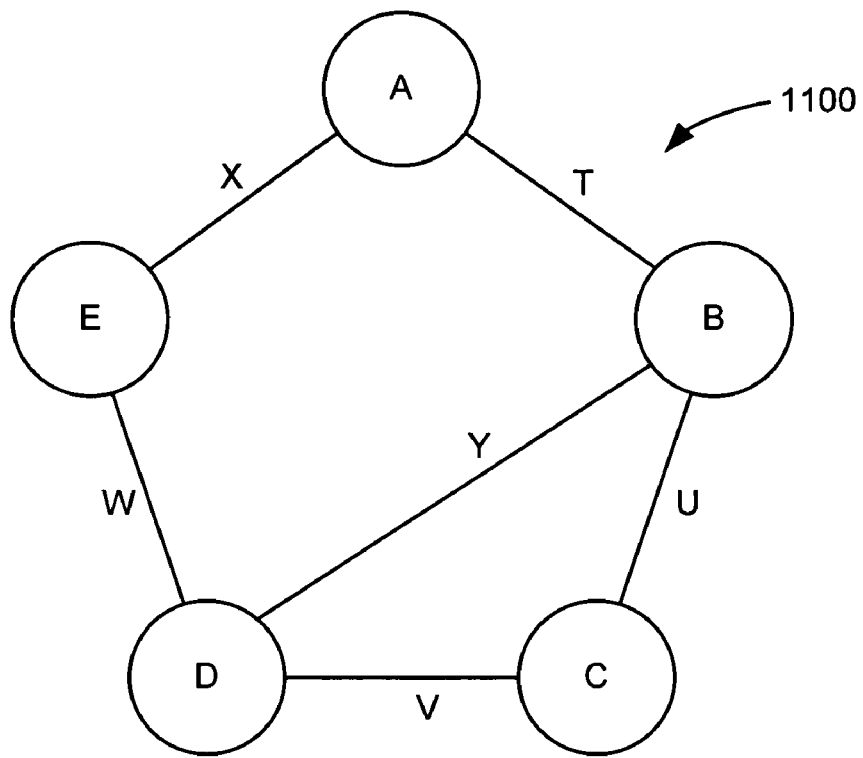
FIG. 11 is a simplified schematic diagram of an exemplary ring network that includes a straddling span.
FIG. 12 is an exemplary ring map, according to another embodiment of the present invention.

Thus far, automatic protection switching has been discussed in the context of compensating for a failed working channel, span or node along a ring. FIG. 11 shows an exemplary ring network 1100 comprising nodes A, B, C, D and E and ring spans T, U, V, W and X. The ring network 1100 also includes a straddling span Y. As noted above, although pre-configured protection cycles (p-cycles) provide a theoretical framework for protecting straddling spans, the prior art BLSR protocol does not support switching traffic as a result of a failed straddling working span.

In the presently disclosed system, straddling spans can, however, be protected by assigning a span ID to each straddling span, pre-configuring one more protect "arcs" for each straddling span and introducing new meanings to a subset of the standard BLSR bridge request commands (or alternatively introducing new commands). For example, new or existing BLSR "span switch" bridge request commands can be used to switch network traffic from a straddling working span onto its pre-configured protection cycle, similar to the way the forced switch-span (FS-S) or signal fail-span (SF-S) commands are used to switch network traffic from a working channel along a ring to its corresponding protect channel, as described above. However, in the case of straddling spans, each protect arc consists of protect channels in one or more ring spans.

Nodes of the network are provisioned to identify straddling spans. For example, the ring map 606 of FIG. 7 can be modified to include a "Straddling Span" column that indicates whether each span of the network is a straddling span or not, as shown in FIG. 12. If a node, at which a straddling span terminates, detects a failure in the straddling span, the node sends a straddling span switch bridge request that includes the span ID of the straddling span. Span switch bridge request commands that implicate a straddling span are interpreted by nodes of the network to mean network traffic is to be switched from the straddling span to the protect arc, i.e. to one or more other spans. If existing BLSR span switch bridge request commands are used to switch straddling span traffic, the semantics of these commands can be distinguished from the traditional span switch commands. That is, a span switch bridge request issued as a result of a failure of a node, a working channel or a span along the ring can be distinguished from a span switch bridge request issued as a result of a failure of straddling span, because the span ID in the command is that of a straddling span, which is easily distinguished from a span ID of a ring span. Span switch requests that implicate spans on the ring, i.e. non-straddling spans, can be handled as described above.

A straddling span (such as span Y) can be protected by one or two protect arcs (such as arcs W-X-T and V-U) along a ring network. (By extension, a straddling span or a connected series of spans that collectively straddle two nodes can be protected by a protect arc that does not necessarily lie completely along the ring.) In the presently disclosed system, the nodes (such as nodes A-E) of the network can be provisioned to identify the protect arc(s) for each straddling span of the network, such as in a "Protect Arc" field in the ring map of FIG. 12. The order in which the protect arcs are listed in the Protect Arc field can indicate a priority order in which the protect arcs are to be selected, in case one or more of the spans of the first selected protect arc(s) are unavailable.

If a straddling span (such as span Y) fails, degrades, is to be exercised, etc., the nodes that detect the failure, degradation, exercise request, etc. (such as nodes B and D) can issue appropriate span switch bridge requests, such as signal fail-span (SF-S), signal degrade-span (SD-S), exerciser-span (EXER-S), forced switch-span (FS-S), etc., with the span ID of the straddling span. (New names and mnemonics for these requests are described below.) Each node receiving such a bridge request can consult its ring map to identify the highest priority available protect arc (such as W-X-T) and switch network traffic from the straddling span to the identified spans of the protect arc.

In one embodiment, 4-bit bridge request codes that are used for traditional span switch bridge requests are also used for straddling span switch bridge requests. (This is referred to as "overloading" the span switch bridge request codes.) As noted, a node receiving a bridge request can differentiate a traditional span switch bridge request from a straddling span switch bridge request by determining whether the span ID of the bridge request refers to a span along the ring or to a straddling span. As with traditional BLSR bridge requests, the straddling span bridge requests can each have a priority. For example, each straddling span bridge request can have a priority just below the corresponding span switch bridge request and just above the corresponding ring switch bridge request. This priority scheme is illustrated in a table of bridge requests shown in FIG. 13. The priority of straddling span bridge requests, relative to traditional BLSR bridge requests, are, however, a matter of design choice. For example, each straddling span bridge request can have a priority just below both the corresponding span request and the corresponding ring request.

Each straddling span bridge request can be represented by any bit pattern, as long as all straddling span bridge requests have bit patterns that are unique among all straddling span bridge requests. That is, the straddling span bridge request codes can be the same as traditional span (-S) and ring (-R) requests, because the span ID field can be used to distinguish straddling span bridge requests from the traditional requests. In another embodiment, new (possibly longer than 4-bit) bridge request codes are selected for the straddling span bridge requests. The particular binary codes selected are a matter of design choice. Mnemonics for the bridge requests shown in FIG. 13 include a "-T" suffix to identify straddling span requests. The mnemonics used for straddling span bridge requests are, however, a matter of design choice.

According to one embodiment of the present invention, a BLSR controller is configured to interpret span switch bridge requests that implicate straddling spans and appropriately switch network traffic. Referring again to FIG. 10, and as noted above, the BLSR controller 1000 can include one or more additional interfaces, such as interface 1010. The interface 1010 can be connected to a working straddling span. For example, the BLSR controller 1000 can be included in node D (FIG. 11), and the interface 1010 can be connected to straddling span Y. The control logic 1014 processes bridge requests as discussed above, according to a priority order, such as the order shown in FIG. 13.

If a straddling span (such as span Y) between two nodes (such as nodes D and B) fails, the two nodes detect the failure. (In cases of unidirectional failures, Remote Defect Indicator (RDI) mechanisms are employed, so both nodes detect the failure.) The two nodes look up the pre-determined protection arc in the ring map, and thus determine the protect path to be used. The two nodes then send switch requests of the appropriate type (FS, SF, MS, SD, etc.). For example, the nodes can send short-path span switch requests into the protect arc and the corresponding long-path span switch requests away from the protect arc. Alternatively, the nodes can send the long-path requests into the protect arc and the short-path requests away from the protect arc. Intermediate nodes along the pre-determined arc decide whether to accept the request, such as based on priorities of existing protect requests in the network. If the request is accepted, protect channels are passed-through, and the request is forwarded to the next node along the protect arc. When each node (D and B) receives the short-path span switch request from the other node, network traffic is switched from the straddling span (Y) to the now set up protect arc.

Intermediate nodes away from the pre-determined protect arc receive the long-path span switch requests. The switch requests are treated as informational, in that these requests do not affect any switchovers in the intermediate nodes. Depending on conditions in the ring and priorities of existing protection requests, these intermediate nodes may or may not forward the long-path span switch requests to subsequent intermediate nodes along the ring. The decision criteria for forwarding these requests are similar to criteria used in traditional long-path span switch requests. In addition, the intermediate nodes can note that protect channels along the pre-determined arc are now in use.

If an intermediate node on the pre-determined protect arc refuses the request, such as because it had received a higher priority request that precludes the switchover request, the intermediate node does not forward the request along the protect arc. Thus, the node (such as node D or B) at the tail end of the protect arc never receives the short-path request from the node at the other end of the protect arc. The tail-end node thus ascertains that the straddling span switch attempt failed. The tail-end node can follow standard BLSR rules applicable to a failure to affect a span switch.

The following exemplary rules can be followed by the BLSR control logic 1014 (FIG. 10) to implement straddling span switching, as described above. These rules are written in a style similar to traditional BLSR rules. For example, the terms "east" and "west" refer to opposite ports of a BLSR controller, to which spans can be connected.

[Rule I-S #100] When an idle node receives a signal failure (SF) line error condition from a west straddling port (i.e. the port of a straddling link that is configured to use the protect arc connected to the west protect port), the node shall send [SF-T,S,IDLE] from its west ring protection port and the node shall send [SF-T,L,IDLE] from its east ring protection port. All such messages should include the west straddling span ID. No switching or bridging cross-connect actions shall occur at this point. In case of an east straddling port failure, the node shall take similar, but vice versa, actions.

[Rule I-S #101] when an idle node receives [SF-T,S,IDLE] that is destined to the node, it shall respond with [SF-T,S,BR] on the short path and with [SF-T,L,BR] on the long path. Meanwhile, it should bridge traffic from the failed straddling span port to the ring protection port on the short path.

[Rule I-P #100] When an idle node receives [SF-T,S,IDLE] that is not destined to the node, it shall enter a full passed-through state, pass K1 and K2 bytes and connect all protection channels from the west to east ring ports.

[Rule I-P #101] When an idle node receives [SF-T,L,IDLE] that is not destined to the node, it shall enter K1 K2 Pass-through state and passed the K1 and K2 bytes only. The request is treated as a span request on the long path and the node behaves the same as for existing rules for BLSR applications. If there is a span failure between two K1 K2 pass-through nodes, the failure can be safely protected by making the SF-S coexist with the SF-T from a straddling span.

[Rule S-S #100] When a switching node, i.e. a node that detects a failure, receives [SF-T,S,IDLE] that is destined to the node, it shall send [SF-T,S,BR&SW] on the short path and it shall send [SF-T,L,BR&SW] on the long path. Meanwhile, the node shall commit the straddling span bridge and switch.

The disclosed protocol allows multiple standard span switches, multiple straddling span switches or a combination thereof to be active concurrently, as long as the respective active protect arcs for the switches are completely disjoint. In addition, two straddling spans, each with a distinct span ID, between a common pair of nodes can be protected, i.e. one of the straddling spans can be protected by the left arc and the other one of the straddling spans can be protected by the right arc of the ring. These multiple straddling span switches are handled in a way similar to multiple span switches, according to standard BLSR protocol. The disclosed protocol allows subsequent higher priority commands to preempt existing switches that protect failed straddling spans. For example, a subsequent signal fail-span (SF-S) request can preempt an existing signal fail-straddling (SF-T).

In the case of two straddling spans (for example span IDs 14 and 15) between a common pair of nodes, span 14 can be protected by a left arc and span 15 can be protected by a right arc. If the straddling span fails, the BLSR controller signals [SF-T,14,short,status] along the left arc and [SF-T,15,short,status] along the right arc. For each span ID, the long-path message is omitted in favor of the more important short-path message for the other span. This discussion assumes the short-path messages sent into the protect arc for traffic switchover purposes and the long-path messages sent away from the protect arc for advisory purposes.

Alternatively, the BLSR controller 1000 (FIG. 10) can be configured to send and interpret span switch bridge requests that implicate straddling spans without using span IDs. Instead of using a span ID to identify a span, the BLSR controller 1000 can identify the span by the IDs of the nodes at which the span terminates. For example, to identify span Y (FIG. 11), a BLSR controller 1000 in node D can place the ID of node D in the source node ID field, and it can place the ID of node B in the destination node ID field, of the K1 and K2 bytes (FIG. 2). Such a source-destination node ID pair uniquely identifies straddling span Y.

Such a span designation is distinguishable from a designation of a span along the ring. A designation of a span along the ring always includes adjacent source and destination node IDs, whereas a designation of the straddling span always includes nonadjacent source and destination node IDs. If more than one span straddles a single pair of nodes, the BLSR controller can use additional information, such as detectable failure information (loss of signal, bit error rate, RDI, REI, etc.) to identify a span implicated by a particular source-destination node pair. Using source and destination node IDs to identify straddling spans does not require modifying the traditional layout of the K1 and K2 bytes in the BLSR protocol.

As described thus far, each straddling span is pre-assigned one or more protect arcs. Such a static protect methodology is adequate, but sub-optimal for multiple failures. A "semi-static" assignment of protect arcs to straddling spans can improve a system's ability to recover from multiple failures. In a semi-static assignment system, after a failure of a working channel, a span of a ring, a straddling working span, etc., some or all still-functioning straddling working spans are reassigned protect arcs. A reassignment algorithm can avoid assigning protect spans that are already protecting failures. (Note that optionally some spans can be assigned to multiple protect arcs, in a sense over-committing these spans.) The reassignment algorithm can be executed by a centralized network element (such as one of the nodes of the ring), an external element (such as an operating system (OS)) or in a distributed fashion among some or all of the nodes of the network. In either case, information about the newly-assigned protect spans can be sent to the nodes over the APS channel or another suitable communication path, and the nodes can then update their respective ring maps appropriately.

Embodiments of the invention have been described with reference to a 4-fiber BLSR ring, however the invention can also be practiced in other network architectures, such as 2-fiber networks, mesh networks, etc., as will be evident to those of ordinary skill in the art. For example, the present invention was described with reference to a 4-fiber BLSR ring, in which working channels and protect channels are implemented as separate fiber links. In a 2-fiber BLSR ring, working channels and protect channels are implemented as separate sets of time slots on a single fiber-optic link. Nevertheless, spans in 2-fiber BLSR rings can be assigned span IDs, and straddling spans can be protected, according to the present invention.

In the case of a 2-fiber BLSR, a straddling span typically has the same total bandwidth as each on-ring span, e.g. OC-48, however this bandwidth is allocated differently in the straddling span than in the on-ring spans. All the time slots of the straddling span are working time slots, whereas only half the time slots of each on-ring span are working time slots. The other half of the time slots in the on-ring spans are protect time slots. Thus, the straddling span of a 2-fiber BLSR must be protected by both arcs, because each arc can provide only half the necessary time slots. In one embodiment, such a straddling span is assigned two distinct span IDs (one ID for each half of the working time slots), and a failure of the straddling span is treated as though it were two separate failures. For example, assume a straddling span is assigned span IDs 14 and 15, half of the time slots are assigned to span 14 and are protected by a left arc and the other half of the time slots are assigned to span 15 and are protected by a right arc. If the straddling span fails, the BLSR controller signals [SF-T,14,short,status] along the left arc and [SF-T,15,short,status] along the right arc. For each span ID, the long-path message is omitted in favor of the more important short-path message for the other span.

In another embodiment, the straddling span is assigned only one span ID, as in the 4-fiber BLSR case described above. If the straddling span fails, short-path messages containing this span ID are sent along both arcs.

In the case of a mesh network, each span can be assigned a unique span ID and protect arcs can be predetermined for each protected span. Alternatively, a determination of a protect arc can be performed as needed, i.e. after a failure is detected. Protected spans can be switched to their respective protect arcs, as described above with respect to on-ring or straddling spans.

In such a mesh network, at least a portion of the mesh, e.g. the protect arc, with or without the working span it protects, is treated as an implied ring. The kinds of messages described above with respect to rings (such as [SF-T,span ID, short-path,status]) can be sent over the protect arc of the implied ring. As an alternative to ring-like signaling along the protect arc, the node(s) that detects a failure uses a broadcasting or flooding mechanism to disseminate failure information to other nodes including, but not limited to, nodes along the protect arc. For example, the node(s) that detects the failure can send messages to its (their) adjacent nodes of the network. These nodes forward messages to their respective adjacent nodes, etc. Thus, all of the nodes of the mesh network are informed of the failure. However, only those nodes on the implied ring take action to cross-connect network traffic, if an available arc exists.

As noted, in some embodiments protect arcs are not pre-determined, i.e. a determination of a protect arc is performed as needed, that is, after a failure is detected. In these cases, a signaling scheme based on broadcasting or flooding can be more appropriate than a signaling scheme based on ring-like signaling, because, at the time the failure is detected, the implied ring has yet to be determined.

Intermediate nodes along the implied ring are configured with information regarding the topology of the implied ring, so these intermediate nodes can forward messages and appropriately cross-connect network traffic in response to a failure. The absence of long-path advisory messages does not affect protection. Furthermore, as discussed above with respect to BLSR, if one protect span is requested to protect multiple span failures, only one such request succeeds.

Depending on a mesh network's topology and conditions within the network, it is possible for a network node to receive a bridge request message that the node previously sent into the network. Such a received request is potentially confusing to the node, because the source of the request might not be unambiguously ascertainable from information in the request. The span ID in such a message uniquely identifies two nodes, i.e. the nodes at the two ends of the identified span. Depending on the path taken by the message and which node receives the message, it may not be possible to ascertain which of the two nodes was the source of the message.

The K1 and K2 bytes (FIG. 4) can be modified, as described above, to include a Source Node Identifier (SNI) bit (not shown) to unambiguously identify the source of such a message. Each of the two nodes identified by the span ID has a node ID. In one state, for example SNI=0, the SNI bit indicates that the source of the message is the node having the higher of the two node IDs. In the other state, for example SNI=1, the SNI bit indicates that the source of the message is the node having the lower of the two lower IDs. Thus, a receiving node can uniquely identify the sender of such a message.

A BLSR controller has been described as including a processor controlled by instructions stored in a memory. Those skilled in the art should readily appreciate that instructions or programs defining the functions of the present invention can be delivered to a processor in many forms, including, but not limited to information permanently stored on non-writable storage media (e.g. read only memory devices within a computer such as ROM or CD-ROM disks readable by a computer I/O attachment) or information alterably stored on writable storage media (e.g. floppy disks and hard drives). In addition, while the invention may be embodied in software, the functions necessary to implement the invention may alternatively be embodied in part or in whole using firmware and/or hardware components such as Application Specific Integrated Circuits (ASICs) or other hardware or some combination of hardware, software and/or firmware components.

While the invention is described through the above-described exemplary embodiments, it will be understood by those of ordinary skill in the art that modifications to, and variations of, the illustrated embodiments can be made without departing from the inventive concepts disclosed herein. For example, the invention is described with reference to bridging network traffic onto a protect span or arc after a failure. In some cases, the term "switching" is used instead of "bridging," however the same meaning is intended. Traditionally bridging involves dualcasting network traffic over both the failed link and the protect span or arc. Alternatively, the network traffic can be redirected onto only the protect span or arc. As used herein, including in the claims, switching and bridging both mean dualcasting or redirecting network traffic. While the invention is described in the context of SONET and BLSR, it applies equally well to SDH and multiplex section shared protection ring (MS-SPRing), as well as other network standards and proprietary schemes based on, or modified from, these standards. Accordingly, the invention should not be viewed as limited, except by the scope and spirit of the appended claims.

What is claimed is:

1. A method of sending a message from a first node of a network to a recipient node of the network, comprising:
   constructing a first message that includes a bridge request, a first path identifier of a first path, and a destination identifier of the recipient node, the first message lacking an explicit source identifier of the first node;
   constructing a second message that includes the bridge request, a second path identifier of a second path, and the destination identifier of the recipient node, the second message lacking an explicit source identifier of the first node;
   sending the first and second messages over the network on the first and second paths, respectively;
   determining a first direction from which the first message arrives at the recipient node;
   determining a second direction from which the second message arrives at the recipient node; and
   determining a span, corresponding to the bridge request, as a function of at least one of: the destination identifier, the first and second path identifiers, and the first and second determined directions from which, respectively, the first and second messages arrived at the recipient node.

2. A method of sending a message from a first node of a network to a recipient node of the network, comprising:
   constructing a first message that includes a bridge request, a first path identifier of a first path, and a source identifier of the first node, the first message lacking an explicit destination identifier of the recipient node;
   constructing a second message that includes the bridge request, a second path identifier of a second path, and the source identifier of the first node, the second message lacking an explicit destination identifier of the recipient node;
   sending the first and second messages over the network on the first and second paths, respectively;
   determining a first direction from which the first message arrives at the recipient node;
   determining a second direction from which the second message arrives at the recipient node; and
   determining a span, corresponding to the bridge request, as a function of at least one of: the source identifier, the first and second path identifiers, and the first and second determined directions from which, respectively, the first and second messages arrived at the recipient node.

3. A non-transitory computer-readable medium having stored thereon a plurality of instructions, the plurality of instructions including instructions which, when executed by a processor, cause the processor to perform the steps of sending a message from a first node of a network to a recipient node of the network, comprising:
   constructing a first message that includes a bridge request, and a first path identifier of a first path, and a destination identifier of the recipient node, the first message lacking an explicit source identifier of the first node;
   constructing a second message that includes the bridge request, and a second path identifier of a second path, and the destination identifier of the recipient node, the second message lacking an explicit source identifier of the first node;
   sending the first and second messages over the network on the first and second paths, respectively;
   determining a first direction from which the first message arrives at the recipient node;
   determining a second direction from which the second message arrives at the recipient node; and
   determining a span, corresponding to the bridge request, as a function of at least one of: the destination identifier, the first and second path identifiers, and the first and second determined directions from which, respectively, the first and second messages arrived at the recipient node.

4. A non-transitory computer-readable medium having stored thereon a plurality of instructions, the plurality of instructions including instructions which, when executed by a processor, cause the processor to perform the steps of sending a message from a first node of a network to a recipient node of the network, comprising:
   constructing a first message that includes a bridge request, and a first path identifier of a first path, and a source identifier of the first node, the first message lacking an explicit destination identifier of the recipient node;
   constructing a second message that includes the bridge request, and a second path identifier of a second path, and the source identifier of the first node, the first message lacking an explicit destination identifier of the recipient node;
   sending the first and second messages over the network on the first and second paths, respectively;
   determining a first direction from which the first message arrives at the recipient node;
   determining a second direction from which the second message arrives at the recipient node; and
   determining a span, corresponding to the bridge request, as a function of at least one of: the source identifier, the first and second path identifiers, and the first and second determined directions from which, respectively, the first and second messages arrived at the recipient node.

* * * * *